R. H. MACHLETT.
X-RAY TUBE.
APPLICATION FILED FEB. 26, 1916.
Reissued May 16, 1916.
14,132.
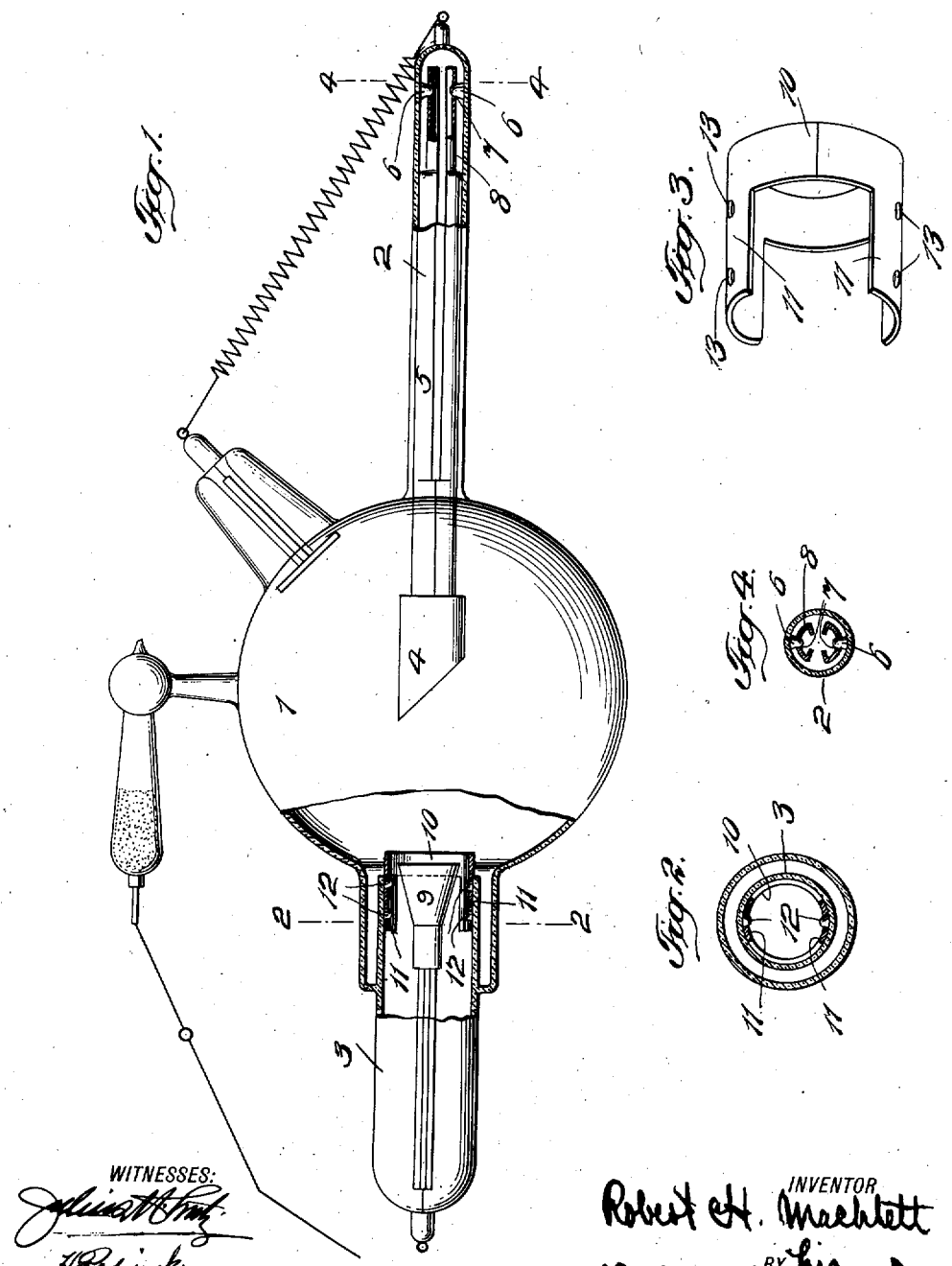
WITNESSES:
J. Ward Hunt
A. Radzinsky
INVENTOR
Robert H. Machlett
BY his
W. Ellery Edwards Jr.
ATTORNEY

UNITED STATES PATENT OFFICE.

ROBERT H. MACHLETT, OF NEW YORK, N. Y.

X-RAY TUBE.

14,132. Specification of Reissued Letters Patent. Reissued May 16, 1916.

Original No. 1,150,530, dated August 17, 1915, Serial No. 872,793. Application for reissue filed February 26, 1916. Serial No. 80,743.

*To all whom it may concern:*

Be it known that I, ROBERT H. MACHLETT, a citizen of the United States, residing at New York, in the county of New York and State of New York, have invented certain new and useful Improvements in X-Ray Tubes, of which the following is a specification.

This invention relates to X-ray tubes, and particularly to the cathodes and anodes thereof, and has for its object the production of an X-ray tube having an anode shank of novel construction, whereby the shank will be held against movement or turning, and a metal shield permanently associated with the cathode neck and surrounding the cathode to prevent the cathode neck from cracking when used in connection with heavy currents. As a rule, when a cathode focus tube is used for a long period, an intense heat is generated at the cathode neck and this causes the tube to break at this particular point, especially when the vacuum is high, and my metal shield over the cathode will take care of this heat and at the same time discharge the pressure accumulated at the end of the cathode.

With these and other objects in view such as the general improvement of X-ray tubes, my invention consists in the novel construction to be hereinafter more fully described and illustrated in the accompanying drawings, in which:

Figure 1 is an elevation of an X-ray tube constructed in accordance with my invention, portions thereof being shown in section, Fig. 2 is a cross sectional view on the line 2—2 of Fig. 1, Fig. 3 is a perspective view of the cathode shield detached, and Fig. 4 is a cross sectional view on the line 4—4 of Fig. 1.

Referring more particularly to the drawings, the numeral 1 designates the usual form of bulb provided with the anode and cathode necks 2 and 3, respectively. The anode 4 is secured upon the usual steel shank 5, disposed within the neck 2, the shank being held against displacement within the neck 2 by protuberances 6 on the interior of the neck extending through holes 7 formed in the reduced end 8 of the shank.

The usual cathode 9 is disposed within the neck 3 and is of the ordinary construction.

In order that the intense heat generated at the cathode may be diffused and prevented from unduly heating the junction of the neck 3 with the bulb 1, I provide a shield formed of some suitable metal, such as steel, and comprising a cylindrical shell 10 having a diameter equal to that of the interior of the neck 3. The shell 10 has portions cut way at diametrically opposite points to provide ears 11 which are adapted to engage the inner periphery of the neck, and the shield is held in place by means of the protuberances 12 which are formed on the inside of the neck 3 and engage holes 13 in said ears.

It will be obvious from the foregoing description and an inspection of the drawings, that the peculiar construction of my anode shank will prevent its turning or becoming displaced in the tube, and that when the shield is in position over the cathode, the glass neck of the cathode will be protected from the bombardment of the rays which are present when the tube is excited, and that it will also be protected from the intense heat that is generated especially when the tube is used for a lengthy period, and that such protection will prevent the cracking or breaking of the neck.

Having thus described my invention what I claim is:

1. An X-ray tube comprising a bulb provided with an anode neck and a cathode neck, an anode shank reduced at one end and having holes therein disposed in said anode neck, protuberances on said anode neck to engage said holes, a cathode disposed in said cathode neck, and a shield disposed around said cathode.

2. An X-ray tube comprising a bulb provided with necks, an anode disposed in one neck, a cathode disposed in the other neck, and a shield disposed around said cathode, said shield comprising a cylindrical shell disposed around said cathode, said shell having portions cut away forming ears, said ears being secured within the cathode neck, and means for causing a hinge movement to said ears.

3. An X-ray tube comprising a bulb provided with necks, an anode disposed in one neck, a cathode disposed in the other neck, and a shield disposed around said cathode, said shield comprising a cylindrical split shell extending around the cathode, ears on said shell fitting against the cathode neck, and protuberances on said cathode neck engaging holes in said ears.

4. An X-ray tube comprising a bulb provided with necks, a cathode disposed in one neck, a shank disposed in the other neck and carrying an anode, a reduced extension on said shank provided with holes, and protuberances on the inner periphery of said second named neck extending into said holes.

5. In a device of the class described, a bulb, a cathode and means for mounting the same, an anode with a shank with parts for receiving protuberances, and a neck containing said shank and provided with protuberances entering the corresponding parts in the shank and holding it in place.

6. In a device of the class described, a bulb provided with two necks, an anode mounted in one neck and a cathode mounted in the other, protuberances in the neck containing the cathode and a metallic shield with parts for receiving said protuberances, said shield being placed about said cathode and insulated from the same and held in place by said protuberances so that said shield acts as a protector to protect the cathode neck from heating rays when the device is in use.

In testimony whereof I hereto affix my signature in the presence of two witnesses.

ROBERT H. MACHLETT.

Witnesses:
O. E. Edwards, Jr.,
W. Hennig,